G. A. BADER.
GOGGLES.
APPLICATION FILED SEPT. 15, 1915.
1,193,340.
Patented Aug. 1, 1916.
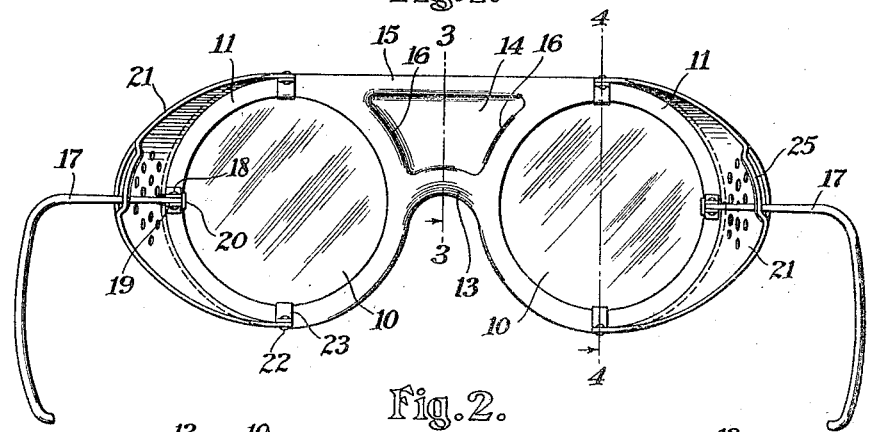
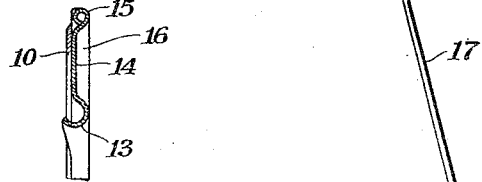
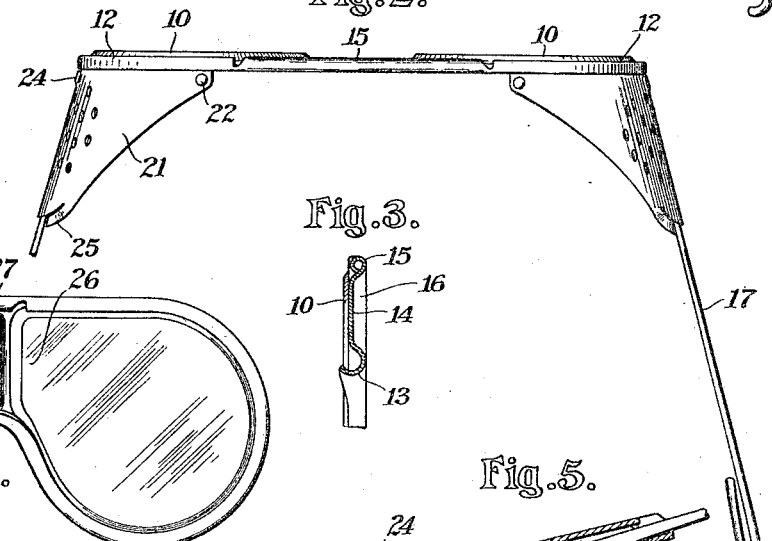
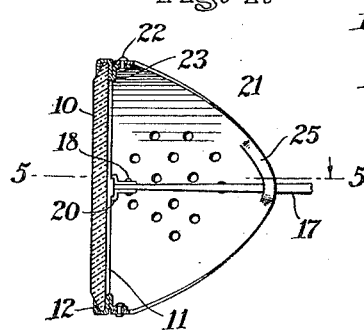
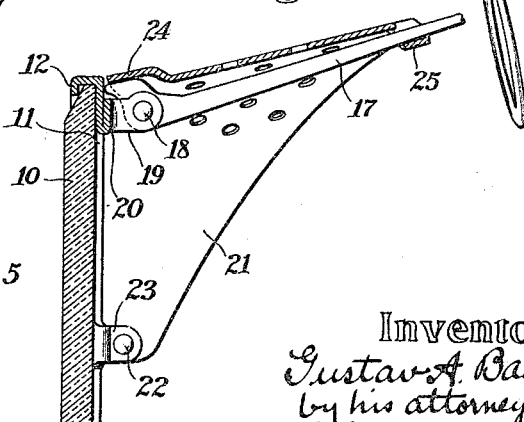
Inventor:
Gustav A. Bader
by his attorneys
Davis & Dorsey

UNITED STATES PATENT OFFICE.

GUSTAV A. BADER, OF ROCHESTER, NEW YORK.

GOGGLES.

1,193,340.   Specification of Letters Patent.   Patented Aug. 1, 1916.

Application filed September 15, 1915. Serial No. 50,907.

*To all whom it may concern:*

Be it known that I, GUSTAV A. BADER, a citizen of the United States, and resident of Rochester, in the county of Monroe and State of New York, have invented certain new and useful Improvements in Goggles, of which the following is a specification.

This invention relates to goggles, or eyeglasses, of the kind employed to protect the eyes against injury by light, dust, or flying particles of material, and particularly such goggles as are used by workmen engaged in grinding, or similar operations, or by the drivers of motor-vehicles.

The invention relates particularly to the frames, the securing-devices, and the guards or shields which are associated with the lenses or glasses, and is independent of the character of the glasses, which may be either plain or lenticular, colored or uncolored.

One object of the invention is to produce goggles in which effective provision is made against injury to the eyes by particles entering between the glasses and adjacent the nose of the wearer. To this end I provide the frame of the goggles with a guard, which extends upwardly, from the bridge, to a point at or adjacent the level of the tops of the lens-frames, this guard being preferably formed integrally with the lens-frames, in the manner hereinafter described.

Another object of the invention is to support the goggles effectively against blows, and to distribute the strain of a blow in such a manner as to avoid injury or discomfort to the user. To this end I provide the frame of the goggles with a rigid convex member or part at the level of the tops of the lens-frames, which is adapted to engage the forehead or the bridge of the nose over an effectively wide surface, and to assist the bridge of the goggles in supporting pressure against the face. This arrangement is particularly useful in connection with goggles having shields of stiff material interposed between the lenses and the sides of the eye-sockets, as is common in goggles of the kind in question, since it prevents the pressure of a blow against the goggles being transmitted to the face through the edges of these shields.

Another object of the invention is to provide the goggles with shields of the kind just mentioned, and to so associate these shields with the temples of the goggles that each shield may be conveniently operated as a unit with the corresponding temple, in folding and unfolding the goggles, while at the same time the temple is independent of the shield to the extent that a temple of any ordinary and commercial form may be employed, and that in introducing the goggles into a case, when in folded position, the temples may be bent in the usual manner to permit them to be folded compactly within the case.

Another object of the invention is to produce a frame which may be conveniently used to support lenses of various forms, and particularly those which do not lend themselves readily to the use of lens-frames of ordinary types. To this end I employ lens-frames in the form of flat, annular, sheet-metal members, constituting seats for the lenses, and the lenses are retained in place against these seats by means of bezels formed integrally from the lens-frames by rolling over the metal at their outer margins.

Another object of the invention is to provide, in a simple, inexpensive and secure manner, for mounting the temples and the lateral shields upon, and pivotally attaching them to, the lens-frames. To this end I use lugs integral with the inner edges of the lens-seats, these lugs being bent rearwardly and serving to receive pivots by which the parts in question are secured to the lens-frames.

Other objects of the invention, and the features of construction by which they are attained, will be set forth hereinafter, in connection with the description of the illustrated embodiment of the invention.

In the accompanying drawings, Figure 1 is a rear-elevation of a pair of goggles embodying the present invention, with the parts in position for use; Fig. 2 is a plan-view of the goggles; Fig. 3 is a vertical section on the line 3—3 in Fig. 1, looking from left to right in the latter figure; Fig. 4 is a vertical section on the line 4—4 in Fig. 1, looking from left to right; Fig. 5 is a horizontal section, on an enlarged scale, showing particularly the connection between one of the temples and the corresponding lens-frame and shield; and Fig. 6 is a partial front-elevation, showing a modified form of the invention.

The invention is illustrated as embodied in goggles having glasses or lenses 10 which are of circular form, as shown in Figs. 1 and 2, and which are or may be of plain glass, colored or uncolored, in accordance with the purpose for which the goggles are to be used.

The lenses are supported in lens-frames, each of which comprises a flat annular member 11, which is of less diameter than the lens so that the lens may rest against its flat forward surface, this member thus constituting a seat for the lens. The lens is secured to its seat by means of a flange or bezel 12 formed by rolling or bending, forwardly and inwardly, the outer margin of the sheet-metal of which the lens-frame is formed.

The lens-frames are connected at the middle by a bridge 13, which is formed integrally from the same sheet-metal as the frames, the metal being rounded outwardly, as shown particularly in Fig. 3, so as to provide a smooth convex surface for engagement with the nose of the wearer, and so as also to stiffen the bridge and afford a more rigid connection for the lens-frames.

One feature of the present invention resides in the provision of means for guarding the space above the bridge and between the lens-frames. To this end the sheet-metal of which these parts are constructed is continued upwardly in the form of a web 14 extending to the level of the tops of the lens-frames, and this web is rolled over at its upper margin to form a tubular member 15 which rigidly connects the tops of the lens-frames. It will be apparent that in the absence of such a guard particles of material projected against the bridge of the nose of the wearer may easily find their way into the eyes, but that this is effectively prevented by the guard 14, particularly as the tubular member 15 is adapted to rest close against the brows and the bridge of the nose, so as to exclude the entrance of particles from above.

The tubular member 15, in addition to serving as a reinforcement for the bridge and a rigid connection between the lens-frames, serves the further important function of assisting the bridge in resisting blows to which the goggles may be subjected. It presents a comparatively broad convex surface for engagement with the face, so that a considerable force may be transmitted through it to the face without injury.

The guard 14 is stamped or otherwise formed as a rearwardly recessed panel, as shown particularly in Fig. 3, so that shoulders 16 are provided at the front. The bezels 12 are necessarily interrupted where they meet the ends of the bridge and of the tubular member 15, and the shoulders 16 serve the useful purpose of engaging the edges of the lenses at the points where they are not engaged by the bezels, and thus holding the lens more securely in place. The recessed formation of the guard has the further advantage that it provides an air-space expanding the bridge of the nose, thus permitting ventilation by the passage of air from one side to another.

The goggles are illustrated as provided with temples 17 of a well known form, and a feature of the invention resides in the simple and effective means for hinging or pivoting these temples to the lens-frames. For this purpose a lug 20 is provided at the inner margin of each lens-frame, this lug being bent rearwardly and outwardly, and having two lateral ears 19 which are bent rearwardly from the lug, so as to bring them into parallel position. These ears support a pivot 18, and the temple 17 is mounted on this pivot between the ears. The construction just described has the advantage that it provides a hinge-member which is integral with the lens-frame and does not depend upon soldering or riveting, and the construction may also be cheaply manufactured. The construction has the further advantage that the hinge is located directly in the rear of the lens-frame, so that it does not involve any lateral projection from the frame as in the case of the more familiar construction of spectacle or goggle frames.

The goggles are shown as provided with shields 21 shaped to close the space between the lens-frames and the sides of the eye-sockets. These shields are made of comparatively stiff or rigid sheet-material, such as thin metal or celluloid, and they are connected, at top and bottom, to the respective lens-frames in such a manner as to permit folding of the goggles. For this purpose pivots 22 are employed, these pivots being mounted in lugs 23 which are formed integrally with the lens-frames at their inner margins, the lugs being bent upwardly or downwardly, as the case may be, and then rearwardly, as shown particularly in Fig. 4, so as to bring the pivotal connections directly in the rear of the lens-frames. This integral construction of the pivot-lugs has the advantages pointed out in connection with the temple-hinges.

The shields 21 are arranged to coöperate with the temples in a manner which constitutes a useful feature of the invention. As shown particularly in Fig. 5, each shield has a recessed portion at the middle of its forward edge, which springs over, and remains in resilient engagement with, the butt of the corresponding temple when the goggles are in position for use.

The engagement, above described, between the shield and the temple is such that in and of itself it will cause the temple to be swung from folded to unfolded position when the shield is swung in the same direction. Accordingly, the goggles may be brought completely to position for use by manipulation of the shields alone. In order to more completely insure the coöperative relation of the shields and temples, however, I prefer to connect them together at the rear margins of the shield, and for this purpose the material of each shield is slit and bent so as to provide a retaining-member 25, between which and the body of the shield the temple is embraced. Owing to this arrangement the goggles may be folded and unfolded by manipulation of the temples alone, if desired, since the shields are constrained to move with the temples.

I am aware that it has been previously proposed to associate the temples and the shields of goggles together in some manner, so that they are simultaneously movable to folded or unfolded position, but in such previous construction, so far as I am aware, either the shields have been of flexible material, so that it has been impossible to operate the temples by manipulation of the shields, or else the temples have been attached integrally or rigidly to the shields. The present construction has the advantage that it permits the use of shields of stiff or rigid material, and of temples of any ordinary form, while providing for the simultaneous movement of the temples and the shields. The present arrangement has the further advantage that it permits the temples to spring or bend freely in their vertical planes throughout their entire length, that is, up to the points where they are hinged to the lens-frames, so that their rear ends may be brought into superposed position with relation to the lens-frames when the goggles are folded, thus permitting them to be introduced into a case of ordinary size and form. This bending of the temples is provided for by the elongation of the part 25, as shown in the drawings, so that the temples have a substantial range of vertical movement with respect to the shields.

In Figs. 1, 2 and 3, the present invention is illustrated as adapted for use in connection with circular glasses or lenses. It is, however, particularly well adapted for use with lenses of other forms, especially such as have reversely curved or concave portions in their outlines, which render it difficult to secure them in the ordinary grooved frame-wires. Such a lens 26 of non-circular form is shown in Fig. 6, and it will be apparent that it may be secured by the bezel, in the manner above described, with the same facility and security as a lens of circular or elliptical form. The lens shown in Fig. 6 is of the kind adapted to give the greatest possible extension in the field of view in the direction of the nose, and where such a lens is used the guard between the lenses and above the bridge will be reduced to a narrow form, being, in fact, merely a vertical channel or rib 27 stamped in the sheet-metal.

While this application sets forth various features of construction which all contribute to the production of goggles which are inexpensive, strong and convenient in use, it will be apparent that these various features are not necessarily all used in conjunction, and that the invention is not limited to the embodiment thereof herein described and illustrated in the accompanying drawings, but may be embodied in various other forms within the nature of the invention as it is defined in the following claims.

I claim:—

1. Eyeglasses comprising a frame formed from a single piece of sheet material and provided with lens seats, flanges bent outwardly about the seats to secure the lenses, and a nose-engaging flange on the under side of the frame between the lens seats bent outwardly from the frame.

2. Eyeglasses comprising a frame formed of a single piece of sheet material and provided with lens seats, flanges bent from the edges of the frame about the lens seats to secure the lenses to their seats, and a bridging portion, the upper edge of the bridging portion being rolled to provide a portion for bearing against the forehead, and the lower portion of the bridging portion being rolled to engage the nose.

3. Eyeglasses comprising lens frames and a bridging portion connecting the lens frames and formed from a single piece of sheet material, the upper edge of the bridging portion being rolled to bear against the forehead, and the lower portion of the bridging portion being rolled to engage the nose.

4. Eyeglasses comprising a frame formed from a single piece of sheet material and provided with lens seats, flanges bent from the sheet material about the seats, and a bridging portion having a rolled upper edge forming a continuation of the flanges about the lens seats.

5. Eyeglasses comprising a frame formed from a single piece of sheet material and provided with lens seats, a bridging portion connecting the lens seats, flanges bent from the edges of the sheet material about the seats except at the bridging portion, and a portion pressed from the bridging portion and having edges adapted for coöperation with lenses on the seats.

6. Eyeglasses comprising a frame formed from a single piece of sheet material and provided with lens seats, a bridging portion connecting the lens seats, flanges bent outwardly from the edges of the sheet material about the lens seats except at the bridging portion, a portion pressed outwardly from the bridging portion to provide an air space and having edges adapted for coöperation with the lenses on the seats, an outwardly-turned flange on the bridging portion for engaging the nose, said flange forming a continuation of the lens-securing flanges, and a rolled portion at the upper edge of the bridging portion for engaging the forehead, said rolled portion forming a continuation of the flanges for securing the lenses.

7. Eyeglasses comprising a continuous annular lens frame, an integral extension proceeding from an edge of the lens frame and overlapping said frame and a pair of ears bent laterally from opposite sides of said extension.

8. Goggles comprising lens-frames; a temple hinged to the outer side of each lens-frame; a shield, of stiff material, pivoted to the upper and lower parts of each lens-frame; and a temple-retaining member fixed to the rear portion of the shield and spaced therefrom to produce an opening through which the corresponding temple passes loosely, said opening being elongated so as to permit the temple to be bent in its vertical plane when the goggles are folded.

GUSTAV A. BADER.

Copies of this patent may be obtained for five cents each, by addressing the "Commissioner of Patents, Washington, D. C."